2,793,196
Patented May 21, 1957

2,793,196

SYNTHETIC RESIN COATING COMPOSITIONS CONTAINING, AS FLATTING AGENTS, ACID PHOSPHATE ESTERS OR AMINE SALTS THEREOF

Robert W. Mason, Newark, Del., assignor to E. I. du Pont de Nemours and Company, Wilmington Del., a corporation of Delaware No Drawing. Application September 17, 1953, Serial No. 380,885

7 Claims. (Cl. 260—30.6)

This invention relates to improved synthetic resin coating compositions, and more particularly to an improved low reflectance coating composition, and novel methods for their preparation.

Synthetic resin coating compositions and enamels are usually formulated to provide high gloss surface coatings of high durability. It is often desirable, however, to provide an enamel type coating which has high durability but low gloss. Such coatings can be prepared from enamels to which suitable flatting agents have been added. Such flatting results in a decrease in specular reflection, even though the pigment used is finely ground and is of enamel quality, having no particles large enough to be seen with a magnifying glass, and no particles which protrude through the dried vehicle film, as is the case with ordinary flat paint formulations. Agents commonly used for flatting include such materials as calcium or zinc salts of stearic or palmitic acid, silica aerogels, finely divided silica, and the like. Disadvantageously, a relatively high amount of these materials is required to obtain zero specular reflection and is usually of the order of 8–10%, based on the vehicle solids content of the composition. The use and presence of such large amounts of additives in the coating adversely affects other essential coating properties, including such undesired results as reducing, softening the hiding power, film, and decreasing leveling.

It is among the objects of this invention to overcome these and other disadvantages of prior methods for producing flatting type coating compositions and enamels, and to provide novel processes for attaining such objects. A particular object is to provide a method for flatting synthetic resin coating formulations to reduce specular reflection. A further object is to provide new synthetic resin coating compositions, and new pigment compositions adapted for use therein. Other objects and advantages of the invention will be apparent from the ensuing description.

These and other objects are accomplished in this invention which comprises preparing an improved coating composition for application to a surface as a coating which is characterized by low specular reflection and high durability and hardness by incorporating in a synthetic resin coating composition a small amount, say, from .1 to 3 parts by weight per 100 parts of synthetic resin vehicle solids, of an organic phosphate ester selected from the group consisting of acid phosphate mixed esters and their amine salts.

In practically adapting the invention in accordance with a preferred embodiment for preparing my improved composition, about 1% by weight of mixed mono- and di-"Lorol" 5 acid phosphates ("Lorol" 5 being a commercial mixture of primary alcohols, predominantly of $C_{12}$ and $C_{14}$ chain length) can be added to or otherwise suitably mixed with a conventional type synthetic resin composition containing, say, about 40% vehicle solids and made up, for example, of a mixture of butylated melamine formaldehyde and phthalic acid coconut oil alkyd. Alternatively, incorporation of the minor amount of mixed ester phosphate in the coating composition or vehicle can be achieved by adding it to the solvent component of the film-forming composition, since said ester phosphates are soluble in most organic liquids, particularly those usually used as thinners and solvents in synthetic resin compositions; or, if preferred, the mixed ester can be added to the pigmenting component and thoroughly incorporated therein prior to introduction of said pigment into the vehicle. A grinding base, composed of the solvent-mixed-ester-phosphate mixture, synthetic resin vehicle, and titanium dioxide pigment of high gloss grade, is then pasesd through a tightly set five-roll paint mill, and thereafter made up to the desired consistency and pigment-binder ratio by the further addition of suitable thinners and vehicle. Surface coatings can be applied to metal panels by spraying, brushing, or other convenient means, and the coated panels then baked to give a white panel with zero specular reflectance, as determined by standard type, well-known reflectometer instrument. A high gloss film obtained by an identical enamel compounded without an added acid phosphate ester graded about 40 on the same reflectometer scale. In addition, the low reflectance film obtained possessed the good durability of a high gloss film.

To a clearer understanding of the invention the following specific examples (in which parts mentioned are by weight) are given. These are merely illustrative and are not to be construed as in limitation of the invention:

Example I

To 100 parts of mixed vehicle containing equal parts of a 50-percent-by-weight solution of butylated melamine formaldehyde resin in a mixed solvent (one part xylene to four parts butanol) and a 50-percent-by-weight solution of butylated urea formaldehyde resin in a mixed solvent (one part xylene to one part butanol) were added two parts of mixed mono- and di-"Lorol" 5 acid phosphates, the "Lorol" 5 being a commercial mixture of primary alcohols, predominantly $C_{12}$ and $C_{14}$. Two hundred parts of high fineness titanium dioxide pigment were then added and the whole mixture passed through a 5-roll paint mill with a tight setting. Two hundred thirty-nine parts of the resulting paste were thoroughly mixed with 300 parts of a vehicle having the following composition:

| | Parts |
|---|---|
| 60 weight percent solution of phthalic acid-coconut oil alkyd in xylene | 2424 |
| Mixed vehicle as described above | 264 |
| Petroleum thinners such as naphtha | 372 |
| Xylene | 468 |
| Butanol | 72 |

After dilution to desired consistency with xylene, the enamel was sprayed onto an aluminum panel and baked at 150° C. for a period of one hour. The reflectance of this panel relative to polished black glass measured with a reflectometer was found to be 0. The reflectance of a panel coated with a similarly prepared composition except that flatting agent addition was omitted therefrom was 37.

Example II

Example I was repeated, except that the flatting agent was mixed and thoroughly incorporated with the dry pigment prior to incorporation in the vehicle. The coated panel so prepared exhibited a reflectance value of 0 compared with 39 for the untreated control.

Example III

The steps of Example I were duplicated except that a mixture of mono- and dioleyl acid ortho-phosphates was substituted for the mixed mono- and di-"Lorol" 5 acid phosphates employed in that example. The panel from the resulting coating composition had a reflectance value of 0, compared with 44 for the untreated control.

*Example IV*

All steps of Example I were duplicated except that in lieu of the phosphates therein employed a commercially available acid phosphate product comprising the di-ethanolamine salts of phosphoric acid esters of octanol-2 and "Lorol" 5 in the mol ratio of 3:2 was substituted. The panel obtained was found to have a reflectance value of 0 compared with 44 for the untreated control.

While specific mixed synthetic resin compositions containing various common synthetic resins have been mentioned and employed above, the invention is not restricted thereto nor to the flatting agents or amounts referred to. Thus, the invention can be applied to other useful synthetic resin vehicles including the phenol aldehyde type, urea resins, alkyd resins, cumarone resins, vinyl resins, toluol sulfonamide resins, chlorinated diphenyls, and the like. As will be evident, the invention is generally adaptable to the treatment of various coating compositions and especially those utilizing a conventional alkyd resin as the vehicle. It is also applicable to the production of enamels utilizing any oil-modified synthetic resin such as melamine or urea-formaldehyde modified drying oil alkyds, melamine or urea-formaldehyde non-oxidizing oil alkyds and the like. The invention is especially suitable for obtaining stable, durable synthetic resin or enamel coating compositions of low reflectance through the dispersion of a white or colored pigment in a synthetic resin vehicle through the customary paint grinding procedure as in a ball, roller, or other type of conventional mechanical mill with suitable modification of the mill base. Resinated coating compositions containing an alkyd resin are well known and comprise certain types of polyhydric alcohol-polybasic acid resins, especially the so-called modified polyhydric alcohol-poly-basic acid resins or resinous condensation products obtained by reacting one or more polyhydric alcohols and one or more polybasic acids with one or more modifying ingredients, such as drying oils, semidrying oils, synthetic drying oils, and monobasic acids, etc. One notable example of these comprises the condensation products of glycerol and phthalic anhydride with linseed oil. These synthetic resin vehicles or solutions can be prepared by heating a mixture of the resin-producing ingredients, other than solvents, at temperatures above the melting point and until completion of the resinification. The properties of the resin can be modified as desired by varying the ingredients and conditions of preparation.

The esters and amine salts indicated as useful flatting agents herein can be prepared in accordance with the procedures described in U. S. Patent 2,005,619. While specific use of several of these acid phosphate mixed esters has been demonstrated and mentioned in the examples, other similar mixed esters of long chain (containing more than 5 carbon atoms) aliphatic alcohols or aromatic alcohols, and their amine salts, can also be usefully employed and added as flatting agents to synthetic resin compositions. Examples thereof include:

Acid octyl, decyl ortho-phosphate
Acid hexyl, stearyl-orthophosphate
Acid oleyl, phenyl ortho-phosphate
Acid oleyl, cresyl ortho-phosphate
Acid undecyl, myristyl, heptadecyl pyrophosphate and the like, and their amine salts.

Films of low specular reflection have many uses in architectural and industrial painting applications. For example, as the surface coating applied to Venetian blinds and similar shading devices the composition of the invention is extremely durable, has extremely good film fineness (no protruding pigment particles visible with a magnifying glass) and low specular reflection. The coating of many objects with films of high durability is often desired in the packaging industry. For example, coating thin steel panels and steel sheeting with a film possessing the composition described in the invention provides a hard, durable film. When large numbers of sheets or panels, coated as described herein, are piled one on top of another immediately after baking, no sticking is experienced.

Among the other advantages of the process of the invention is the fact that only a small amount of the flatting agents is required to obtain the desired effect. Whereas, for ordinary flatting agents 8–10% is required, less than 3 percent of the acid phosphate mixed esters of the invention is satisfactory. No loss of leveling, brushing, or hiding power is experienced while an improvement in film hardness is achieved by their use in the quantity specified. Furthermore, low reflectance pigmented films when pigmented with high film fineness grades of titanium dioxide pigment or other pigments normally used in gloss paints have a "depth of finish" appearance not found in flat paints of high pigment-binder ratio.

I claim as my invention:

1. A process for flatting a synthetic resin coating formulation containing a solvent and pigmenting ingredient to reduce to zero the specular reflection thereof on application and adherence to a surface to be protected, comprising incorporating in such formulation, in which the synthetic resin is selected from the group consisting of melamine formaldehyde, urea formaldehyde, phthalic acid alkyd resins and mixtures thereof, a small amount of a flatting agent comprising an organic phosphate ester selected from the group consisting of acid phosphate mixed long chain organic esters and their amine salts.

2. A process for preparing an improved adherent coating composition adapted to provide a zero value specular reflection and high durability and hardness upon application and drying on a surface to be protected comprising incorporating in a pigmented synthetic resin coating formulation selected from the group consisting of melamine formaldehyde, urea formaldehyde, phthalic acid alkyd resins and mixtures thereof, from about .1 to 3 parts by weight per 100 parts of synthetic resin vehicle solids in the coating, of an organic phosphate selected from the group consisting of acid phosphate mixed along chain organic esters and their amine salts.

3. A new adherent coating compositions adapted to provide on application and drying on a surface to be protected a zero value specular reflection and high durability and hardness, comprising a pigmented, solvent-containing synthetic resin coating composition selected from the group consisting of melamine formaldehyde, urea formaldehyde, phthalic acid alkyd resins and mixtures thereof, containing from .1 to 3 parts by weight, per 100 parts of synthetic resin vehicle solids, of an organic phosphate selected from the group consisting of acid phosphate mixed long chain organic esters and their amine salts.

4. A new adherent coating composition adapted to provide on application to and drying a surface to be protected a zero specular reflectance and high durability and hardness, comprising a synthetic resin vehicle selected from the group consisting of melamine formaldehyde, urea formaldehyde, phthalic acid alkyd resins and mixtures thereof containing a minor amount of an organic phosphate flatting agent selected from the group consisting of acid phosphate mixed long chain organic esters and their amine salts, and a finely ground titanium dioxide pigment.

5. A new adherent coating composition adapted to provide on application to and drying on a surface to be protected a zero specular reflectance and high durability and hardness characteristics comprising a pigmented synthetic resin vehicle selected from the group consisting of melamine formaldehyde, urea formaldehyde, phthalic acid alkyd resins and mixtures thereof containing from about .1 to 3 parts by weight, per 100 parts of synthetic resin vehicle solids present in said coating, of an organic phosphate flatting agent selected from the group consisting of acid phosphate mixed long chain organic esters and their amine salts.

6. A new adherent coating composition adapted to provide on application to and drying on a surface to be protected a zero specular reflectance and high durability and hardness characteristics comprising a pigmented synthetic resin vehicle selected from the group consisting of melamine formaldehyde, urea formaldehyde, phthalic acid alkyd resins and mixtures thereof containing from about .1 to 3 parts by weight, per 100 parts of synthetic resin vehicle solids present in said coating, of an organic phosphate flatting agent comprising mixed mono- and di-lauryl and myristyl acid phosphates.

7. A new adherent coating composition adapted to provide on application to and drying on a surface to be protected a zero specular reflectance and high durability and hardness characteristics comprising a pigmented synthetic resin vehicle selected from the group consisting of melamine formaldehyde, urea formaldehyde, phthalic acid alkyd resins and mixtures thereof containing from about .1 to 3 parts by weight, per 100 parts of synthetic resin vehicle solids present in said coating, of a mixture of mono- and dioleyl acid ortho phosphates.

References Cited in the file of this patent
UNITED STATES PATENTS 2,293,673 Hershberger _____ Aug. 18, 1942

OTHER REFERENCES

Hochwalt et al., Ind. Eng. Chem., 34, 20–25 (1942).